United States Patent Office 3,268,848
Patented August 23, 1966

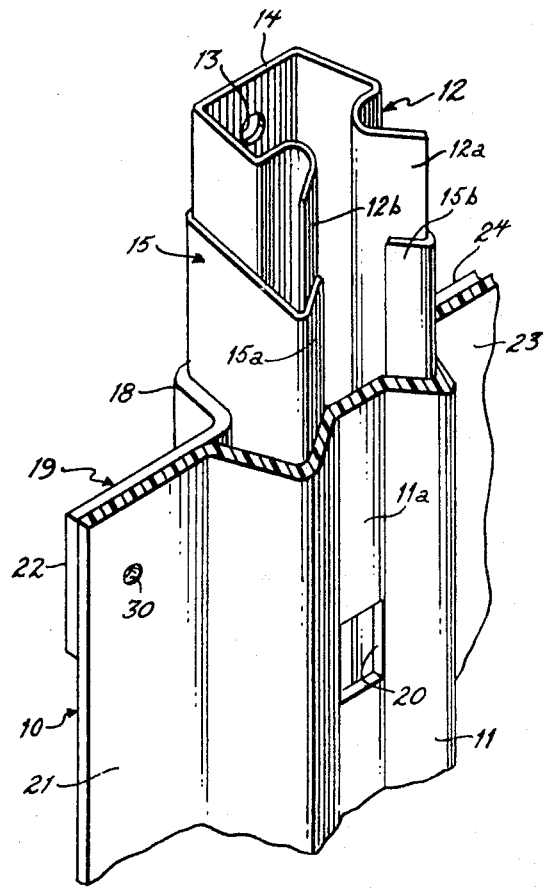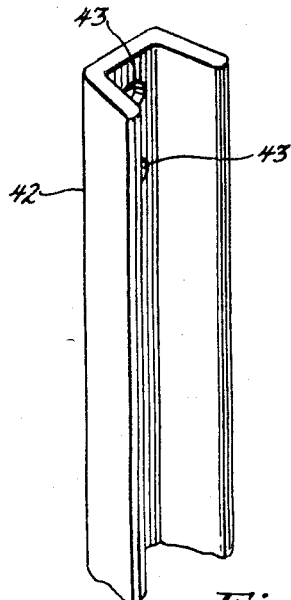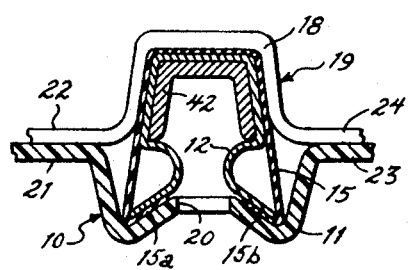

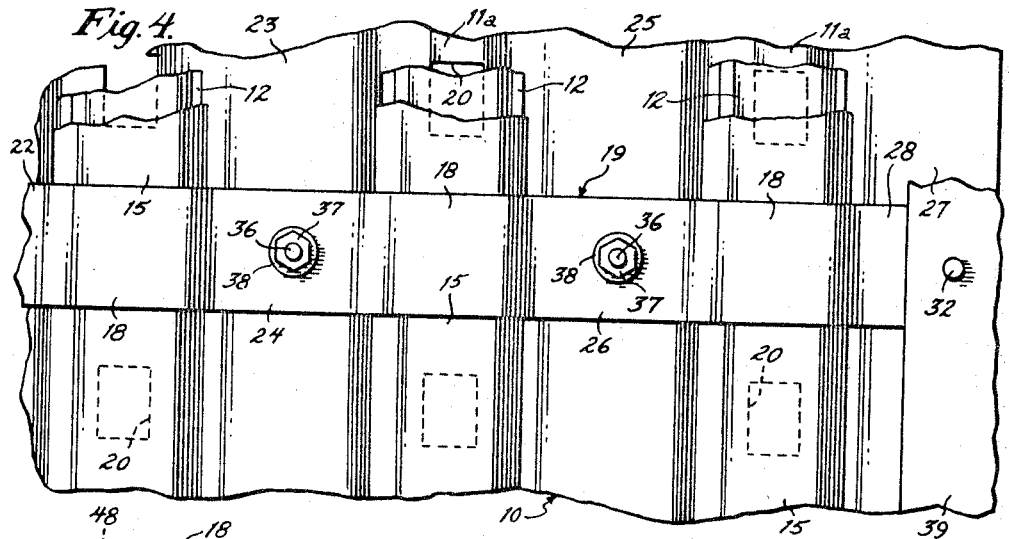
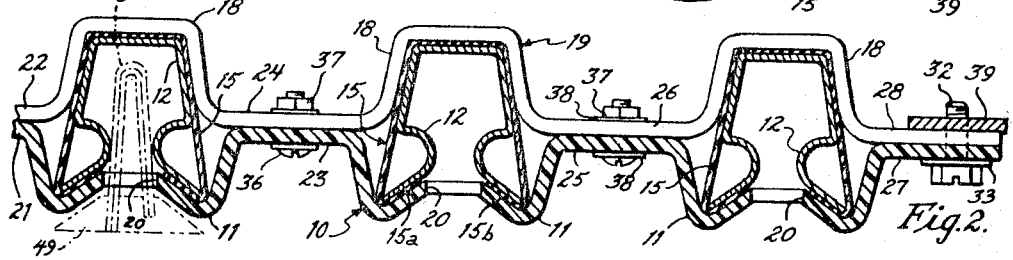
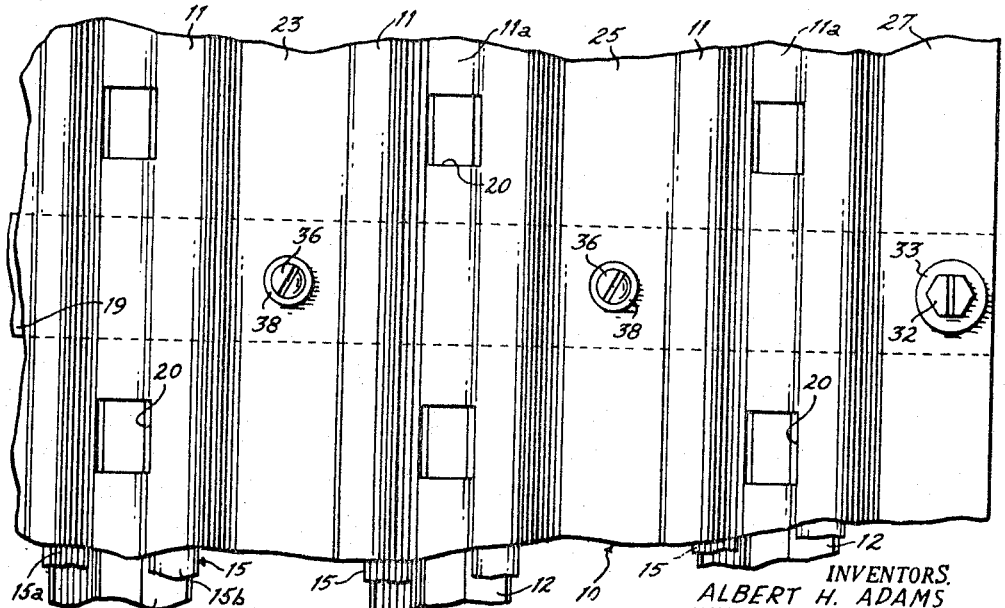
INVENTORS.
ALBERT H. ADAMS
WILLIAM F. OLASHAW
BY
ATTORNEY.

3,268,848
BUS BAR TYPE ELECTRIC POWER DISTRIBUTION SYSTEM WITH FORMED INSULATING SHEET HOUSING
Albert H. Adams, Simsbury, and William F. Olashaw, New Britain, Conn., assignors to General Electric Company, a corporation of New York
Original application Sept. 5, 1961, Ser. No. 135,880, now Patent No. 3,170,092, dated Feb. 16, 1965. Divided and this application Nov. 21, 1963, Ser. No. 325,235
2 Claims. (Cl. 339—22)

This application is a division of our earlier filed application Serial No. 135,880, filed September 5, 1961 now Patent No. 3,170,092, issued February 16, 1965 and assigned to the same assignee as the present invention. The aforesaid application Serial No. 135,880, in turn, is a continuation-in-part of our application Serial No. 79,287, filed December 29, 1960 and now abandoned.

This invention relates to electrical distribution systems, concerning especially the supporting and insulating of bus conductors.

Systems for distribution of electrical current, such as to a number of motors or the like from a central location, customarily employ heavy-duty conductors or busses in elongated form adapted to receive electrical probes for conductive contact therewith. If supported only at their ends or at infrequent intervals of length, such conductors, especially as they become hot and expand during use, are subject to distortion and consequent risk of probe misalignment and faulty contact. Also, if left uncovered or only partly covered by insulation, such bus conductors constitute a safety hazard for operating personnel and are more readily subject to short circuits and consequent equipment damage.

A primary object of the present invention is provision of insulating means for supporting a bus conductor along substantially its entire length.

An object is construction of insulated busways adapted to receive electrical probes at spaced intervals.

A particular object is cooperation between probe-receiving insulating means and a generally channel-shaped bus conductor whereby the conductor is retained in position by the insulating means with the channel opening oriented to receive the probes.

A further object is effective support and insulation of either a principal bus conductor or a combination of principal and auxiliary bus conductors without structural change in the supporting and insulating means.

Other objects of this invention, together with ways and means of attaining the various objects, will be apparent from the following description and the accompanying diagrams of a preferred embodiment thereof.

FIG. 1 is a perspective view, partly sectioned, of a portion of electrical distribution apparatus of this invention.

FIG. 2 is a plan, largely in section, of apparatus conforming to that of FIG. 1;

FIG. 3 is a front elevation of the apparatus of FIG. 2, partly cut away;

FIG. 4 is a rear elevation of the apparatus of FIG. 2, partly cut away;

FIG. 5 is a fragmentary perspective view of an auxiliary bus conductor useful with apparatus of the preceding views, according to the present invention; and FIG. 6 is a largely sectional plan of a portion of apparatus of this invention including that of FIG. 5.

In general, the objects of this invention are accomplished, in an electrical distribution system, by means of a channel-shaped sheet of insulating material adapted to accommodate a bus conductor in a channeled portion of the sheet and adapted to receive electrical probes through the bed of the channeled portion for contact with the conductor. The lateral support afforded such bus conductor by the channeled portion of such sheet is supplemented by means of striplike retaining means bridging the channel opening and affixed to flanking portions of the sheet, and the insulation so provided is preferably supplemented by an intervening jacket about at least a portion of the conductor. The invention comprehends particularly such supporting of a generally channel-shaped bus conductor with its channel opening juxtaposed to the bed of the channeled portion of the insulating sheet. Also contemplated by the present invention is the nesting of an auxiliary bus conductor within such channel-shaped conductor in electrical distribution apparatus so provided.

At FIG. 1 we have shown a bus duct structure comprising a generally planar channeled sheet 10 of insulating material sufficiently rigid to be self-supporting. The sheet 10 may, for example, be formed of a material such as a glass-reinforced polyester resin and is provided with one or more elongated channel-like recesses 11 having beveled sides, only one such recess being shown at FIG. 1. Within the recess 11 is positioned an elongated channel-shaped or split tubular electric bus conductor 12 having its opposite sidewalls turned inwardly and then reversely flared outwardly, as at 12a, 12b, to form an elongated slot along one side thereof having flared rims. The slotted side of the conductor 12 lies against the bottom wall or bed of the channel 11 in the insulating sheet 10. An upper end 14 of the bus conductor 12 has a pair of bolt holes 13 (only one being shown) to facilitate connection to a main bus bar, and optionally to an auxiliary bus conductor as set forth hereinafter. The conductor end 14 protrudes from an elongated tubular jacket 15 of channel-shaped insulating material which surrounds the back, sides and part of the flared front or rim of the channel-shaped conductor 12. The channeled insulating sheet 10 includes coplanar flat body portions or flanges 21 and 23 extending to both sides of the channel 11. A central longitudinally extending part 11a of the bed of the forwardly channeled portion 11 of the sheet 10 is indented in conformity with the parallel flared rim or edges of the bus conductor 12 and has apertures 20 (one visible in this view) therein communicating with the interior of the channeled bus conductor 12 by way of the slot-like opening in the front of the insulating jacket 15.

Also visible in FIG. 1 is an oppositely channeled or offset retaining strip 19 juxtaposed to the insulating sheet 10 from the rear and sandwiching the partially jacketed bus conductor 12 between a channeled or offset portion 18 of the strip 19 and channeled portion 11 of the sheet 10. The strip 19 which may be made of any sufficiently strong structural material, conveniently is of metal, hence the presence of insulating jacket 15 between it and the bus conductor. Flat end portion 22 at the left of the strip 19 is juxtaposed to the rear face of flange 21 of the sheet 10, and oppositely extending flat portion 24 of the strip is juxtaposed to the rear face of flat portion 23 of the sheet 10. Beveled oppositely to the sides of the channeled portion of the sheet, the sides of the channeled portion of the strip fit against the adjacent portions of the sides of the jacket 15. Hole 30 visible in the flange of the sheet is located opposite a corresponding hole (not visible) in the end part of the retaining strip to receive suitable means for fastening the respective members together and, if desired, to external supporting structure.

FIG. 2 shows, in plan, sectioned just above retaining strip 19, a multiple busway formed like the single busway of FIG. 1 and accommodating three bus conductors 12, spaced laterally at equal intervals, each in its individual insulating jacket 15. The transverse section of each of these channel-shaped bus conductors resembles the longitudinal section of a wide-mouthed urn (inverted in this view): flat based with outwardly sloping sides subsequently necking inward and terminating in a flaring rim with its opposite outer edges aligned with the sides. Inturned front edge portions 15a, 15b of each insulating jacket 15 are sandwiched between the inside surface of the bed of channeled portion 11 of the insulating sheet 10 and the flaring rim of the bus. The rim of the bus conductor lies adjacent the bed of the channel with the side edges of the jacket front therebetween and with the neck of the bus directly opposite apertures 20 in the indented central part of the channel bed. Shown in phantom in the leftmost of the busways in this view is probe 48 in the form of a V-shaped stab protruding from supporting block 49, which is beveled to fit into the indented or recessed portion of the channel bed about aperture 20; the stab contacts the neck of the bus conductor and terminates at the apex of the V near the base of the channel of the conductor.

It is also apparent in FIG. 2 that right flange 27 of the sheet is contiguous with rightmost flat end portion 28 of retaining strip 19, which is secured thereto and to supporting structure 39 by bolt 32 threaded therein after passing through washer 33 and then the sheet and the strip as mentioned. The extreme leftmost portions, which were shown in FIG. 1, appear only fragmentarily in this view. Intervening flat sheet portions 23 and 25, which flank the middle channeled portion of the sheet, are held contiguous with respective flat portions 24 and 26 of the strip 19 by means of bolts 36 and nuts 37, together with pairs of washers 38. The beveled edges of channeled portions 11 of the sheet are out of contact with the underlying insulating jackets opposite the necked portions of the bus bars.

FIG. 3 shows, in front elevation, part of the longitudinal extent of the apparatus of FIG. 2; this apparatus is partly cut away at the left and below to show members that otherwise would be wholly or largely hidden in such a view. Thus, a portion of retaining strip 19 is visible at the left, and broken lines suggest its location behind the illustrated part of sheet 10 and in line with bolts 36 and bolt 32, with their respective washers 38 and 33. The visible portion of central part 11a of each channeled portion 11 of the sheet contains two apertures 20, located respectively above and below the level of the retaining strip. Bits of the three respective bus conductors 12 and partially overlying side edges 15a, 15b of their respective insulating jackets 15, aligned with channeled portions 11 of the sheet, are visible where the sheet is cut away at the bottom of this view.

FIG. 4 shows, in rear elevation, much the same part of the longitudinal extent of the apparatus of FIG. 2 as appears in front elevation in the intervening view; it also is partly cut away (here, at the top of the view) to reveal otherwise hidden features. Only a part of supporting structure 39 appears at the right, ahead of end portion 28 of the strip and flange 27 of the sheet, to which it is fastened by bolt 32, of which only the end is visible. The ends of bolts 36 are visible protruding through washers 38 and nuts 37 at the back of intermediate flat portions 23 and 25 of the retaining strip. Jackets 15 are visible surrounding and partly cut away about bus conductors 12 lying in the respective parallel channeled portions (which may be considered to be generally concave corrugations, viewed from this side) of the sheet, and the jackets are cut away to reveal part of the exterior of the conductors.

FIG. 5 shows, in perspective, auxiliary bus conductor 42 (broken off at the bottom), which is of simple channel shape with slightly flaring sides. As is apparent to some extent from FIG. 1 and the preceding decsription, and as will be more fully apparent from FIG. 6, this conductor is adapted to be used in conjunction with the more complex principal bus conductors 12 previously shown. Boltholes 43 in the auxiliary bus are disposed for juxtaposition to boltholes 13 of the principal bus of the preceding views, and are adapted to receive bolts (not shown) to aid in retaining the respective bus conductors in place and contiguous with one another.

FIG. 6 shows, in sectional plan (only retaining strip 19 appearing unsectioned), a single busway constructed according to this invention, with auxiliary bus conductor 42 in place therein, together with the principal bus conductor 12 previously shown, as at the left in FIG. 2 but without a stab therein. The flat base and flaring sides of principal bus conductor 12 fit snugly about the exterior of the auxiliary bus conductor in nested relation, and the necked portion of the principal bus curves about the channel edges of the auxiliary bus, thereby retaining the buses in nested position as shown. The principal bus is conveniently retained in place in the busway by pressure of a plurality of retaining strips, like that previously shown, spaced along the rear surface of the insulating sheet between the levels at which successive apertures 20 are located in the sheet itself. The resulting compressive distortion of the principal bus by such strips is adequate to compress the necked portion of such conductor against the channel edges of the auxiliary bus and thereby retain or aid in retaining the respective conductors in the illustrated nested relationship.

The insulating sheets of this invention are readily constructed, as by pressing or molding, from suitable insulating materials, such as polyester or other synthetic resin, preferably reinforced by filaments or fibers of glass or organic polymer. The retaining strips may be similarly composed and formed or may be made up, as indicated above, of conductive material. Whereas the sheets and strips should be substantially rigid, the insulating jackets preferably are resilient; a suitable jacket composition is butyl rubber, which may be molded in the desired configuration, or other similar elastomeric materials adapted to such use will be apparent to persons ordinarily skilled in the art. The probe-receiving apertures may be molded in the insulating sheet or may be punched therein after sheet formation, as may the boltholes, and any other openings, such as may be desired for receiving a guide or the like to ensure proper alignment of the probes. Of course, the bus conductors are made of copper or other good electrical conductor. They can be formed most conveniently from flat bars or sheets by rolling, as will be apparent from their configurations, but pressing, stamping or similar operations may be employed in forming them if desired. The fastening hardware is wholly conventional.

The advantage of lateral support for the bus bars provided by means of the channeled or generally corrugated insulating sheet has been mentioned above and is immediately apparent from the diagrams. Of course, the sheets are adapted to similar use with other bus conductors than those illustrated and described herein, and the overall configuration of the sheets may be altered to accommodate other generally channeled or other bus conductors, or otherwise, while retaining this advantageous feature, although the preferred configurations of sheets and busses have been specified particularly. Similarly, the number, shape and spacing of probe-receiving apertures and retaining strips may be varied without involving a departure from the inventive concept or the benefit of the insulation of bus conductors in the respective busways. The bus bar isolation so provided is an especially advantageous feature in three-phase electrical distribution systems and in cabinet structures for electric apparatus.

Thus, while we have illustrated and described in detail only a preferred embodiment of our invention, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. An electric bus bar type power distribution system comprising:
   (a) an elongated generally planar sheet of rigid insulating material having a plurality of parallel longitudinally extending channels formed therein between substantially co-planar flange portions;
   (b) said channels having bed portions intermediate the side wall portions thereof, said bed portions having a plurality of longitudinally spaced apertures therein;
   (c) an electric bus bar conductor positioned in each of said channels with a first side of said conductor adjacent said bed portion of said channel;
   (d) an insulating jacket covering a second side of said conductor opposite said first side;
   (e) bus bar retaining means extending transversely across said insulating sheet and bridging said channels, said retaining means being in contact with said insulating jackets of each of said bus bars, and means rigidly connecting said bus bar retaining means to said co-planar flange portions of said insulating sheet, whereby said bus bar conductors are supported against movement toward and away from each other, and are completely insulated and whereby said apertures provide access to said bus bar conductor by contact probes inserted through said apertures.

2. An electric bus bar type power distribution system comprising:
   (a) an elongated generally planar sheet of rigid insulating material having intermediate portions thereof deformed out of the general plane of said sheet at a first side thereof to form a plurality of parallel longitudinal channels opening toward the side of said sheet opposite said first side;
   (b) an electric bus bar conductor positioned in each of said channels, whereby at least one side of each of said bus bar conductors is substantially completely shielded by said sheet of insulating material;
   (c) said channel-forming portions having openings therein affording access to said bus bar conductor by contact probes inserted from the direction of said first side of said insulating sheet, and
   (d) bus bar retaining means retaining said bus bars in place in said channels against the force of said contact probes.

References Cited by the Examiner

UNITED STATES PATENTS

| | | | |
|---|---|---|---|
| 1,815,509 | 7/1931 | Hoecher | 339—21 |
| 1,871,292 | 8/1932 | Alden | 339—22 X |
| 1,945,731 | 2/1934 | Cohen | 339—21 |
| 1,988,627 | 1/1935 | MacLellan | 339—21 |
| 2,072,703 | 3/1937 | Beersman | 339—21 |
| 2,478,006 | 8/1949 | Paden | 339—21 |
| 2,963,537 | 12/1960 | Carlson et al. | 339—22 X |
| 3,012,217 | 12/1961 | Pantin | 339—21 |
| 3,096,131 | 7/1963 | Adams | 339—22 |

EDWARD C. ALLEN, *Primary Examiner.*

PATRICK A. CLIFFORD, *Examiner.*